US012103659B2

(12) United States Patent
Collado

(10) Patent No.: US 12,103,659 B2
(45) Date of Patent: Oct. 1, 2024

(54) TRACK DOOR FOR AIRCRAFT

(71) Applicant: Textron Aviation Inc., Wichita, KS (US)

(72) Inventor: Paul C. Collado, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 130 days.

(21) Appl. No.: 18/046,765

(22) Filed: Oct. 14, 2022

(65) Prior Publication Data

US 2023/0122760 A1 Apr. 20, 2023

Related U.S. Application Data

(60) Provisional application No. 63/257,356, filed on Oct. 19, 2021.

(51) Int. Cl.
| | | |
|---|---|---|
| *B64C 1/14* | (2006.01) | |
| *B64D 47/00* | (2006.01) | |
| *E05D 15/10* | (2006.01) | |
| *E05F 15/652* | (2015.01) | |

(52) U.S. Cl.
CPC ............ *B64C 1/1407* (2013.01); *B64D 47/00* (2013.01); *E05D 15/1047* (2013.01); *E05F 15/652* (2015.01); *E05D 2015/1055* (2013.01); *E05Y 2201/434* (2013.01); *E05Y 2201/684* (2013.01); *E05Y 2201/686* (2013.01); *E05Y 2201/688* (2013.01); *E05Y 2201/70* (2013.01); *E05Y 2201/702* (2013.01); *E05Y 2201/71* (2013.01); *E05Y 2900/502* (2013.01)

(58) Field of Classification Search
CPC ... B64C 1/0685; B64C 1/1438; B64C 1/1407; B64C 1/1446; B64C 1/143; B64D 1/06
See application file for complete search history.

(56) References Cited

U.S. PATENT DOCUMENTS

| | | |
|---|---|---|
| 4,470,566 A | 9/1984 | Fitzgerald |
| 8,991,761 B2 | 3/2015 | Pritzen et al. |
| (Continued) | | |

FOREIGN PATENT DOCUMENTS

WO    2011163453 A1    12/2011

OTHER PUBLICATIONS

Gear Motions, Advantages of Worm Gears, Jun. 14, 2017, [https://gearmotions.com/advantages-of-worm-gears/#:~:text=Worm%20gears%20can%20be%20used,they%20have%20good%20meshing%20effectiveness.] (Year: 2017).*

*Primary Examiner* — Timothy D Collins
*Assistant Examiner* — Justin Michael Heston
(74) *Attorney, Agent, or Firm* — AVEK IP, LLC

(57) ABSTRACT

A track door system for an aircraft includes a door having a first side and a second side opposite the first side. A first roller track and a second roller track are aligned adjacent one another on the first side of the door. A third roller track and a fourth roller track are aligned adjacent one another on the second side of the door. A first motion driver is configured to move the door along the first roller track and the second roller track. A second motion driver is configured to move the door along the third roller track and the fourth roller track. A drive unit is operatively coupled to the first motion driver and the second motion driver to provide electromechanical power for cooperatively moving the door forward to an open position or aft to a closed position.

20 Claims, 8 Drawing Sheets

(56) References Cited

U.S. PATENT DOCUMENTS

| | | | | |
|---|---|---|---|---|
| 2011/0315822 | A1* | 12/2011 | Fairchild | E05F 15/652 244/129.5 |
| 2013/0263514 | A1* | 10/2013 | Parsley | B64C 1/1446 49/463 |
| 2018/0222567 | A1* | 8/2018 | López Fernández | B64C 1/1407 |

* cited by examiner

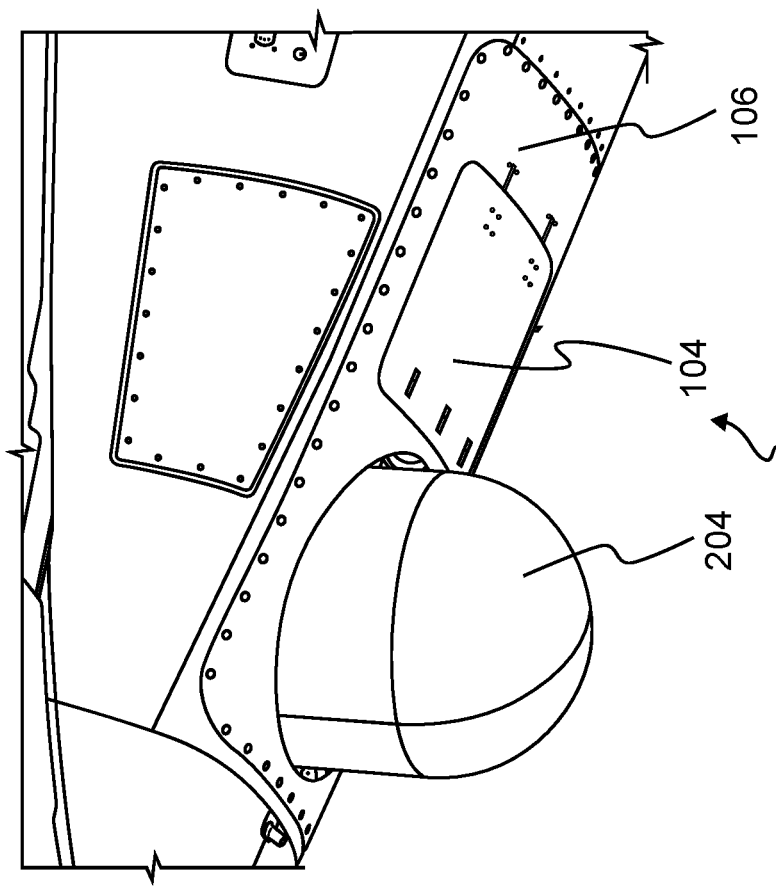
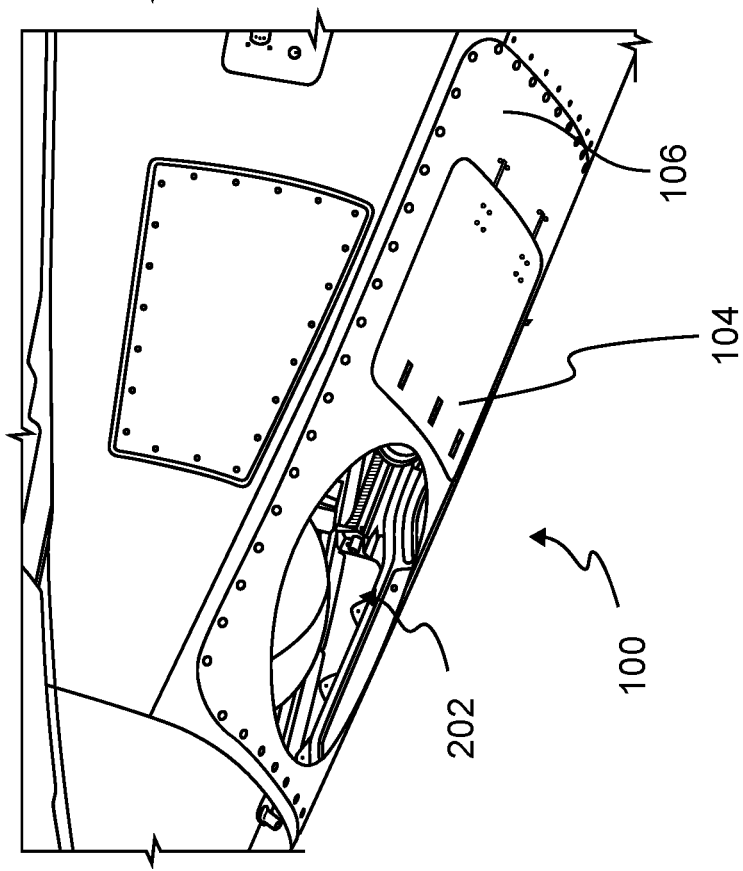

TRACK DOOR FOR AIRCRAFT

CROSS-REFERENCE TO RELATED APPLICATIONS

This application claims the benefit of priority of U.S. Provisional Patent Application No. 63/257,356, entitled Track Door for Aircraft and filed on Oct. 19, 2021, the disclosure of which is herein incorporated by reference in its entirety.

BACKGROUND OF THE INVENTION

1. Field

The disclosed embodiments relate generally to the field of door mechanisms. More specifically, the embodiments relate to a track door that facilitates the storage and deployment of intelligence, surveillance, and reconnaissance (ISR) equipment onboard aircraft.

2. Description of the Related Art

Many different types of aircraft doors have been described in the prior art. For example, PCT Application No. WO 2011/163453 to Fairchild discloses a door assembly for an aircraft fuselage that is mounted on guides to move between an open configuration and a closed configuration. U.S. Pat. No. 8,991,761 to Pritzen et al. describes an actuating mechanism for a vent door in an aircraft that is guided along guide rails. U.S. Pat. No. 4,470,566 to Fitzgerald describes an actuation mechanism for latching and unlatching an aircraft plug-type door that is guided by a pair of lower tracks and a single set of upper tracks.

Other door types include slatted garage door style types that are one size fits all and do not conform to the shape of the aircraft. The slatted garage door style types are also easily spotted by an ordinary observer outside the aircraft when the door is closed.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a track door system for an aircraft includes: a door including a single piece of material, wherein the door includes a first side and a second side opposite the first side; a first roller track and a second roller track, wherein the first roller track and the second roller track are aligned adjacent one another on the first side of the door; a third roller track and a fourth roller track, wherein the third roller track and the fourth roller track are aligned adjacent one another on the second side of the door; a first motion driver configured to move the door along the first roller track and the second roller track; a second motion driver configured to move the door along the third roller track and the fourth roller track; and a drive unit operatively coupled to the first motion driver and the second motion driver, wherein the drive unit is configured to provide electromechanical power for driving the first motion driver and the second motion driver to cooperatively move the door forward to an open position or aft to a closed position.

In an embodiment, a track door system for use in a tail cone of an aircraft includes: a doorway in a bottom side of the tail cone; a track door configured for opening and closing the doorway, the track door including: a forward pair of tracks mounted inside the tail cone on opposite sides of the track door; a forward pair of rollers each mounted on a forward end of the track door and configured to roll in a respective one of the forward pair of tracks; an aft pair of tracks mounted inside the tail cone on opposite sides of the track door; and an aft pair of rollers each mounted on an aft end of the track door and configured to roll in a respective one of the aft pair of tracks; an access panel disposed forward of the doorway in the bottom side of the tail cone, wherein the access panel is disposed between the forward pair of tracks; the track door is configured to roll forwards and upwards along the forward pair of tracks and the aft pair of tracks for stowing inside the tail cone while the track door is in an open position; the track door is configured to roll aft and downwards for sealing the doorway while the track door is in a closed position; and removal of the access panel provides an opening for accessing an inside of the tail cone between the forward pair of tracks while the track door is in the closed position.

BRIEF DESCRIPTION OF THE SEVERAL VIEWS OF THE DRAWINGS

FIG. 2A illustrates the tail section of the aircraft with the track door in an open configuration for some embodiments;

FIG. 2B illustrates the tail section of the aircraft with the track door in the open configuration and with a sensor deployed for some embodiments;

Figure 1:
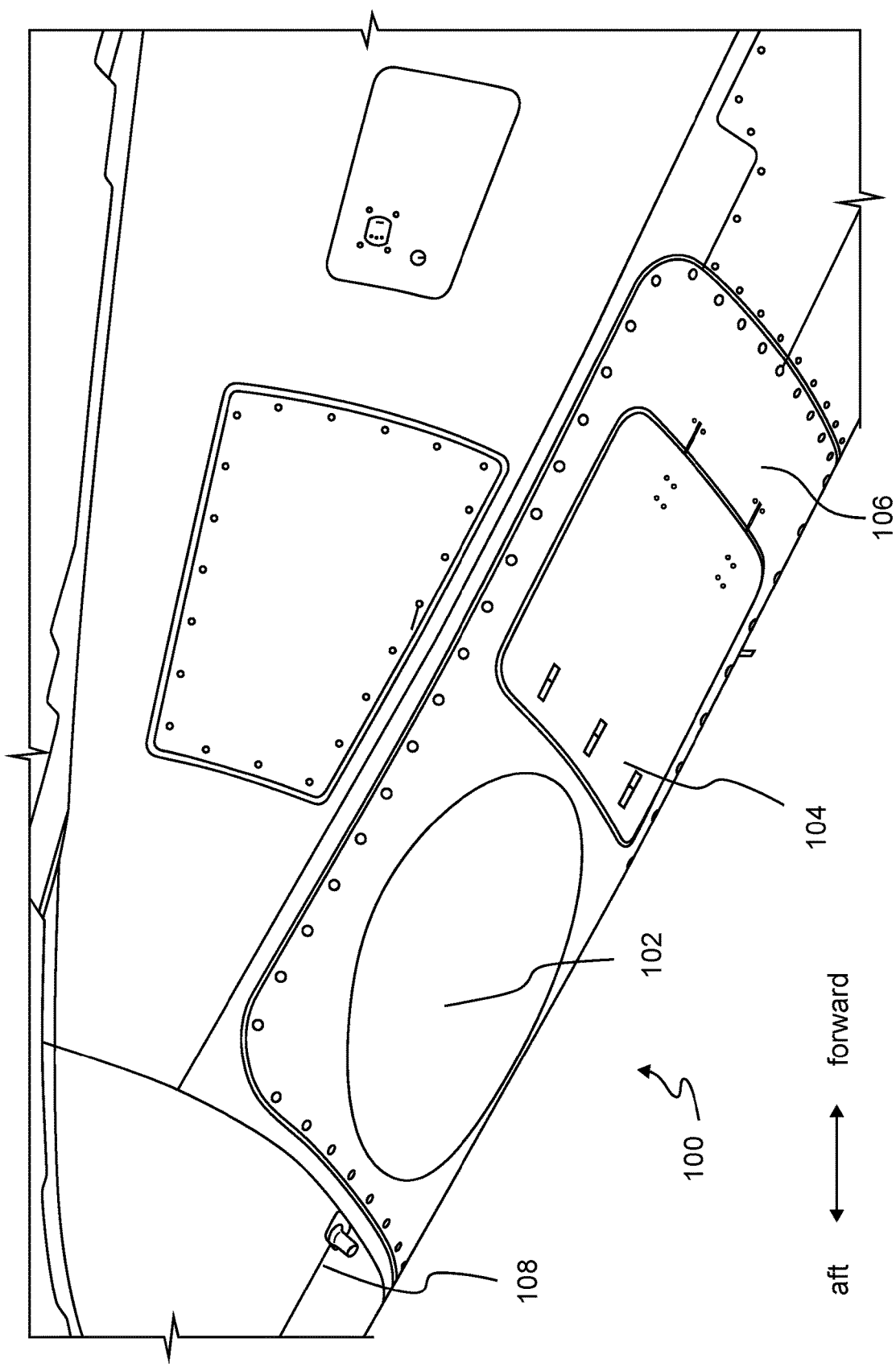
FIG. 1 illustrates an exterior view of a tail cone of an aircraft having a track door in a closed configuration for some embodiments.

Illustrative embodiments are described in detail below with reference to the attached drawing figures, which are incorporated by reference herein and wherein:

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments are generally directed to a mechanized track door for use in aircraft. In some embodiments, the track door comprises a single piece of material and is shaped to match the contours of an exterior surface of the aircraft. The track door may be configured to retract inwards within the fuselage. By retracting inwards, the track door avoids exposure to aerodynamic forces enabling opening and closing of the door at a large range of typical flight speeds. The track door may move on a pair of roller tracks, each roller track actuated by an actuator. The actuators may comprise a ball-screw mechanism and a linear motion guide. The actuators may be powered by a single drive unit. In some embodiments, the single drive unit is located equidistant between the actuators. In some embodiments, the track door is located in a tail cone of the aircraft where aircraft maintainers perform maintenance. As such, the track door may be configured to allow access to the tail cone for maintenance to be performed. Alternatively, the track door may be adjacent a maintenance door and the pair of roller tracks are configured to allow access by an individual through the maintenance door. The track door may also be configured to be inconspicuous within the overall design of the aircraft, thus allowing for the concealment of surveillance equipment, for example.

FIG. 1 illustrates an exterior, bottom view of tail cone 100 of an aircraft. As shown, tail cone 100 may comprise track door 102, access door 104, and fairing access panel 106. Track door 102, access door 104, and fairing access panel 106 may be adjacent to tail cone fairing 108 of the aircraft. However, embodiments are not limited to track door 102 being located near tail cone fairing 108. Broadly, track door 102 may be disposed at any location of the aircraft. As described above, track door 102, in operation, may move inwards within tail cone 100 and forwards towards the nose of the aircraft such that track door 102 translates above access door 104 when opened. In some embodiments, track door 102 is substantially circular, ovular, rectangular, square, or any other geometrical shape. As briefly described above, track door 102 may be configured to look substantially similar to access door 104 and fairing access panel 106 and other portions of tail cone 100, such that track door 102 blends in with the maintenance panels of the aircraft to conceal its presence and that of any surveillance equipment stored behind track door 102.

Access door 104 may comprise hinges, latches, screws, or other fasteners allowing a maintainer to open access door 104 and gain access to tail cone 100. In some embodiments, access door 104 comprises a set of three latches that allow access door 104 to hinge forwards. In some embodiments, access door 104 is substantially circular, ovular, rectangular, square, or any other geometrical shape. In some embodiments, access door 104 has a length of about 12 inches to about 18 inches and a width of about 18 inches to about 24 inches. In some embodiments, access door 104 has a length of about 15 inches and a width of about 21 inches. In some embodiments, removing access door 104 provides an access opening with a length of about 10 inches to about 15 inches and a width of about 19 inches to about 21 inches. In some embodiments, removing access door 104 provides an access opening with a length of about 13.5 inches and a width of about 21 inches.

Track door 102 and access door 104, in some embodiments, are located in fairing access panel 106. As illustrated in FIG. 1, fairing access panel 106 is substantially rectangular. In some embodiments, fairing access panel 106 may be substantially ovular or any other geometric shape. Fairing access panel 106 may comprise a first opening in which track door 102 is disposed and a second opening in which access door 104 is disposed. In some embodiments, fairing access panel 106 comprises a plurality of screws or bolts on a perimeter allowing for the removal of fairing access panel 106 from tail cone 100. Removing at least one of access door 104 or fairing access panel 106 may allow for a maintainer to access tail cone 100 and perform maintenance within the plane. In some embodiments, fairing access panel 106 and/or access door 104 can be removed without removing track door 102 from tail cone 100. As will be discussed in further detail below, track door 102 may also be removable from tail cone 100. In some embodiments, removing track door 102, access door 104, and fairing access panel 106 provides a maintenance opening having a length of about 35 inches to about 45 inches and a width of about 18 inches to about 24 inches. In some embodiments, removing track door 102, access door 104, and fairing access panel 106 provides a maintenance opening having a length of about 40 inches and a width of about 21 inches.

FIGS. 2A and 2B illustrate tail cone 100 with track door 102 in an open position for some embodiments. As shown in FIG. 2A, retraction of track door 102 reveals a doorway 202 within fairing access panel 106. In the illustrated position, track door 102 may be substantially above access door 104 within tail cone 100. Looking now at FIG. 2B, a sensor 204 has been deployed through doorway 202. In some embodiments, retracting track door 102 into the open position automatically triggers the deployment of sensor 204. Sensor 204 may be any sensor, such as an instrument, camera, radar, lidar, and the like. In some embodiments, sensor 204 has a diameter of about 16 inches to about 24 inches. In some embodiments, sensor 204 has a diameter of about 20 inches.

Figure 3B:
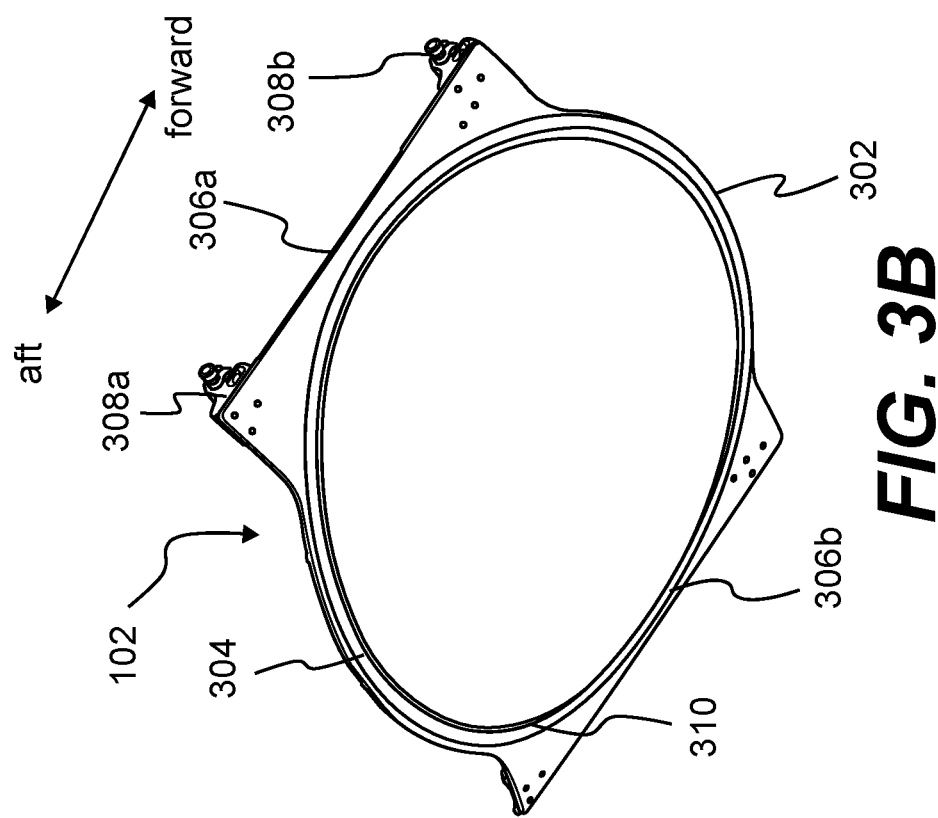
FIG. 3B illustrates an isometric view of an outside surface of the track door for some embodiments.
Figure 3A:
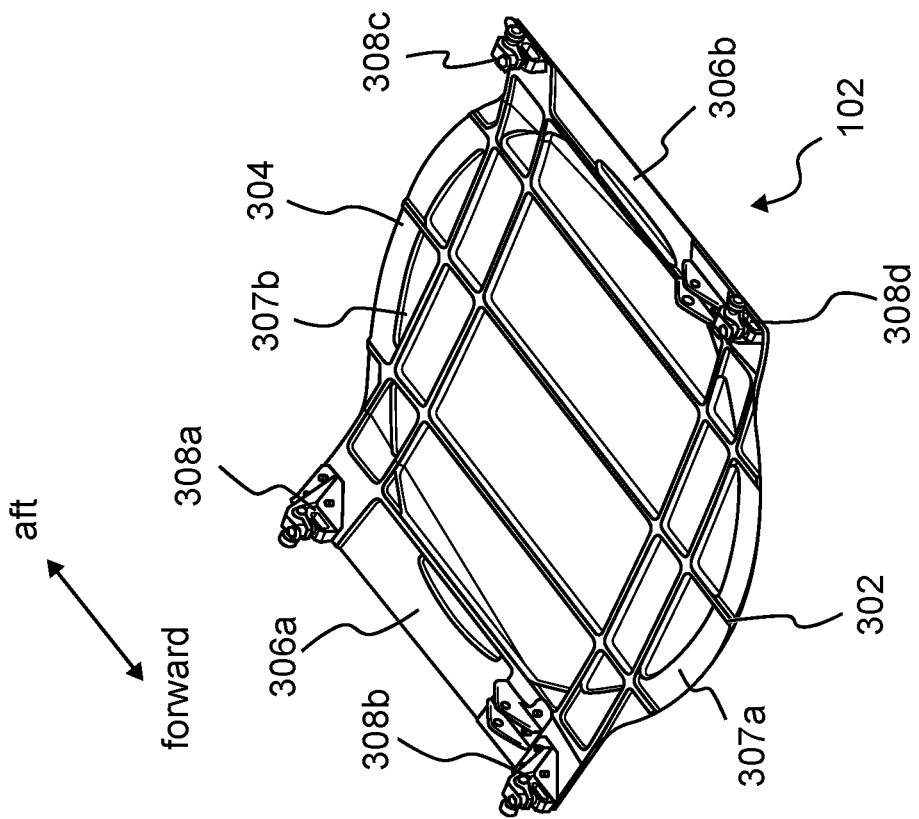
FIG. 3A illustrates an isometric view of an inside surface of the track door for some embodiments.

Turning now to FIG. 3A, an isometric view of an inside surface of track door 102 for some embodiments is depicted. Track door 102 may comprise aluminum, stainless steel, titanium, magnesium, copper, iron, nickel, zinc, or any combination thereof. In some embodiments, track door 102 comprises an aircraft grade aluminum alloy, such as aluminum 2024, aluminum 7075, or aluminum 6061.

Track door 102 comprises a proximal end 302, which may be oriented towards the forwards end of the aircraft when installed, and a distal end 304, which may be oriented towards the aft end of the aircraft. In the closed position, proximal end 302 may be substantially adjacent to track door 102, and distal end 304 may be substantially adjacent to tail cone fairing 108 (see FIG. 1). A first lateral end 306a and a second lateral end 306b form opposing sides of track door 102. Lateral ends 306a, 306b may be substantially perpendicular to proximal end 302 and 304. When track door 102 is in the closed position, proximal end 302 and distal end 304 are exposed to the air stream (see FIG. 1 with the ovular portion of track door 102 on the outer surface of tail cone 100). Lateral ends 306a, 306b may be disposed within tail cone 100 when track door 102 is in the closed position and abut against an inner surface of fairing access panel 106. When track door 102 is opened, track door 102 then moves inwardly within tail cone 100 and towards the forward end of the aircraft.

In some embodiments, track door 102 has a length of about 21 inches to about 29 inches from proximal end 302 to distal end 304 and a width of about 21 inches to about 29 inches from first lateral end 306a to second lateral end 306b. In some embodiments, track door 102 has a length of about 25 inches from proximal end 302 to distal end 304 and a width of about 25 inches from first lateral end 306a to second lateral end 306b. As illustrated, track door 102 may be substantially rectangular, albeit with a first curved section 307a that extends towards proximal end 302 and a second curved section 307b that extends towards distal end 304. Broadly, track door 102 may take any geometric shape or combinations of geometric shapes to fit doorway 202 in fairing access panel 106. In some embodiments, track door 102 is substantially curved to conform to the shape of an underside of tail cone 100.

Also present on the inside surface of track door 102, in some embodiments, are first track roller fitting 308a, second track roller fitting 308b, third track roller fitting 308c, and fourth track roller fitting 308d. As will be discussed in further detail below, track roller fittings 308a, 308b, 308c, 308d may aid in fitting track door 102 to the contours of tail cone 100. First track roller fitting 308a and second track roller fitting 308b may be disposed at first lateral end 306a. Third track roller fitting 308c and fourth track roller fitting 308d may be disposed at second lateral end 306b. In some embodiments, less than four track roller fittings 308a, 308b, 308c, 308d may be present in track door 102.

FIG. 3B illustrates an isometric view of an outer surface of track door 102 for some embodiments. As shown, track door 102 may comprise a seal 310 for sealing an opening of tail cone 100 such as doorway 202. Seal 310 may interface with an inside face of fairing access panel 106 to seal tail cone 100. In some embodiments, seal 310 comprises a synthetic rubber, silicone, fluorosilicone, fluorocarbon, or various other thermoplastics or elastomers. Seal 310 may provide a water-tight seal that prevents moisture from entering tail cone 100. In embodiments, seal 310 is configured to complete an aerodynamic barrier of track door 102.

Figure 4:
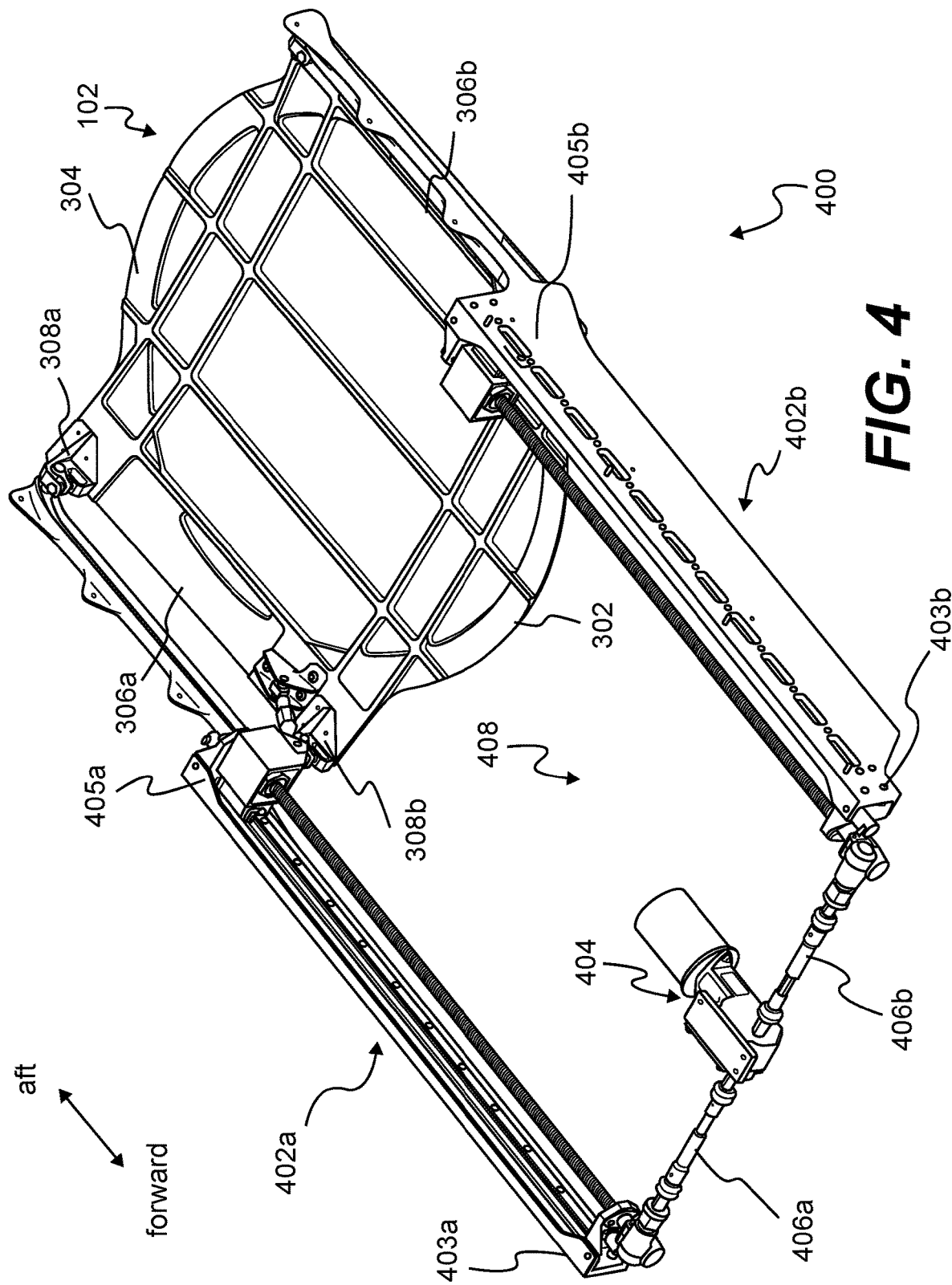
FIG. 4 illustrates an isometric view of a track door system for opening and closing the track door for some embodiments.

FIG. 4 illustrates track door system 400 for some embodiments. Track door system 400 may comprise track door 102, a first actuator 402a, a second actuator 402b, a centrally located drive unit 404, a first driveshaft 406a, and a second driveshaft 406b. As will be discussed in further detail below with respect to FIG. 6, actuators 402a, 402b may comprise a set of roller tracks that move track door 102 forwards, thus creating doorway 202 for the deployment of sensor 204. Actuators 402a, 402b may be disposed on the outer edges of track door system 400, substantially in-line with first lateral end 306a and second lateral end 306b. In some embodiments, actuators 402a, 402b are removable from track door system 400. In some embodiments, actuators 402a, 402b are substantially similar.

In some embodiments, first actuator 402a and second actuator 402b are positioned equidistant from drive unit 404. Drive unit 404 may be disposed towards the forward end of the aircraft and longitudinally opposite track door 102, such that drive unit 404 does not obstruct access to opening 408 behind access door 104 when track door 102 is closed. In this manner, access by personnel is maintained through access door 104, and access may be provided through both of access door 104 and doorway 202 (see FIG. 2A) if track door 102 is removed from the aircraft as further described below. Drive unit 404 may be substantially in-line with proximal ends 403a, 403b of actuators 402a, 402b while distal ends 405a, 405b may connect to lateral ends 306a, 306b. As described above, when track door 102 is in the open position, track door 102 is positioned above access door 104 and proximal end 302 is positioned below drive unit 404. In some embodiments, the distance between first actuator 402a and second actuator 402b is about 21 inches. As such, in some embodiments, drive unit 404 is positioned about 10.5 inches from actuators 402a, 402b. Utilizing a single drive unit 404 allows for actuators 402a, 402b to be driven at substantially the same rate, thus preventing track door 102 from becoming misaligned (e.g., racking) and jamming. In some embodiments, two drive units 404 are present, with one drive unit 404 present for each of actuators 402a, 402b. In such an embodiment, additional components, such as a position sensor and a speed controller, may be used to ensure actuators 402a, 402b are driven at the same rate. Actuators 402a, 402b may be mechanically linked to drive unit 404 via driveshafts 406a, 406b. In some embodiments, driveshafts 406a, 406b are substantially similar. As shown, driveshafts 406a, 406b extend substantially perpendicularly from drive unit 404, with first driveshaft 406a extending opposite from second driveshaft 406b and actuators 402a, 402b extend substantially perpendicularly from driveshafts 406a, 406b.

Also illustrated in FIG. 4 is access door opening 408. Access door opening 408 may correspond to the location of access door 104 as illustrated in FIGS. 1, 2A, and 2B and illustrates the access space provided by removal of access door 104. Thus, as shown, by disposing actuators 402a, 402b on outer edges of track door system 400, access door opening 408 provides a substantially open space between actuators 402a, 402b for aircraft maintainers to access the inside of tail cone 100 and perform necessary maintenance while track door 102 is installed and positioned in the closed configuration.

In some embodiments, track door system 400 is operable to close and open track door 102 in about 8 seconds. As described above, by retracting track door 102 inwards into tail cone 100 instead of outwards into the airstream, track door system 400 may be operated at typical operational flight speeds. In some embodiments, track door system 400 is configured to operate on an aircraft with a max flight speed of about 325 knots. Additionally, outward-opening doors tend to impart substantial vibrations onto sensors 204, degrading the data received by sensors 204. As such, retraction of track door 102 inwardly may improve the quality of data received from sensor 204.

Figure 5:
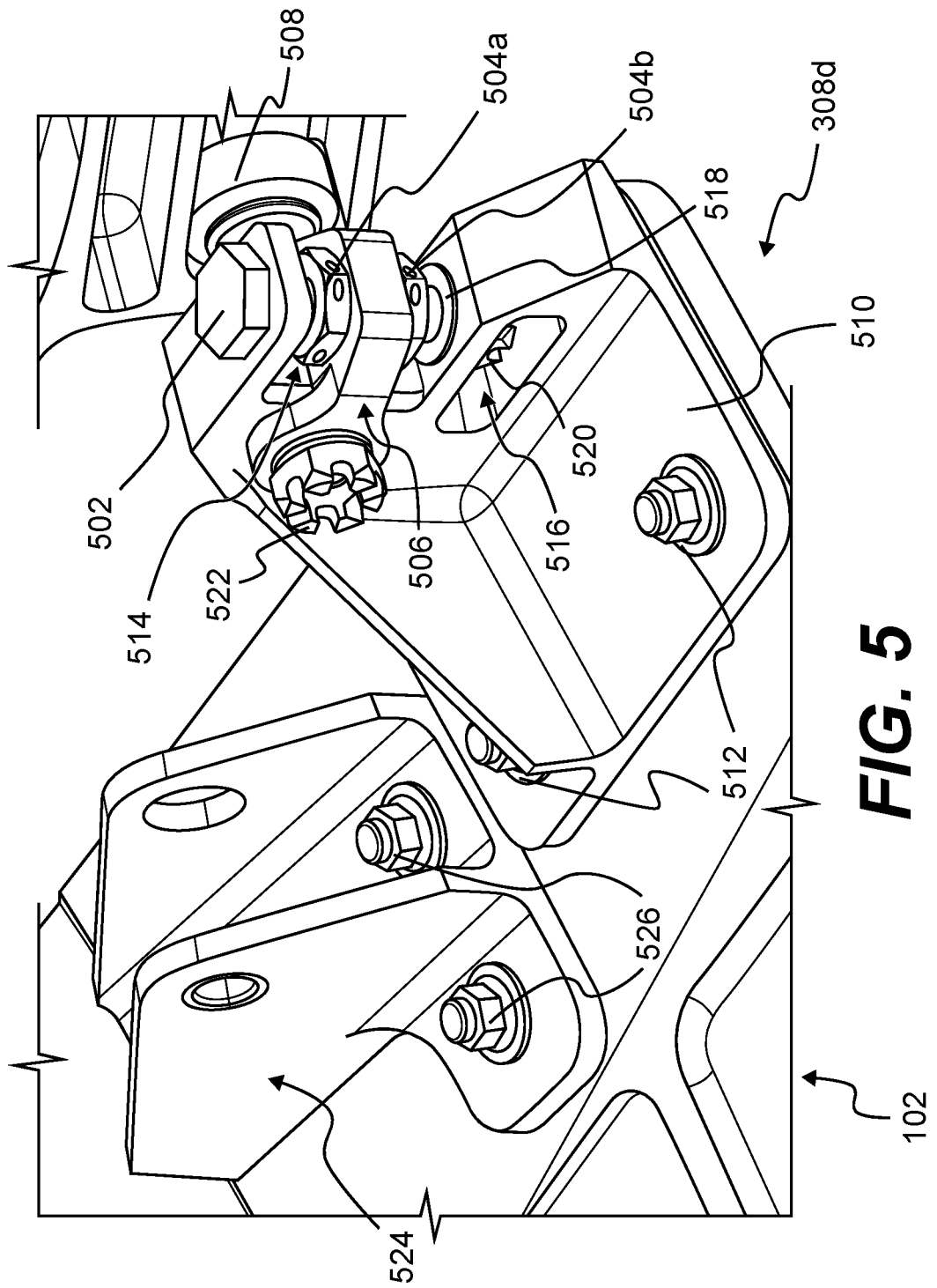
FIG. 5 illustrates a track roller fitting for use with the track door for some embodiments.

Referring now to FIG. 5, fourth track roller fitting 308d is illustrated for some embodiments. In some embodiments, first track roller fitting 308a, second track roller fitting 308b, third track roller fitting 308c, and fourth track roller fitting 308d are substantially similar. As described above, track roller fittings 308a, 308b, 308c, 308d may be used to adjust the positioning of track door 102 to allow track door 102 to conform to the outer mold line of tail cone 100, making track door 102 substantially flush with the external surface of tail cone 100. Thus, a moisture and aerodynamic barrier may be created for the interior of the aircraft.

First track roller fitting 308a may comprise an adjuster screw 502, a first jam nut 504a, a second jam nut 504b, a roller adjustment carrier 506, a track roller 508, and fitting body 510. As shown, fitting body 510 may be fastened to the inside surface of track door 102 via at least one roller fitting bolt 512, screw, or other mechanical fastener. Fitting body 510 may comprise a top slot 514 and a bottom slot 516 through which adjuster screw 502 may be inserted. Roller adjustment carrier 506 may comprise a slot therethrough for insertion of adjuster screw 502. In some embodiments, roller adjustment carrier 506 is secured to fitting body 510 on either side of top slot 514. First jam nut 504a may be threaded onto an outer surface of adjuster screw 502 and abut against at least one of top slot 514 or a top face of roller adjustment carrier 506. Second jam nut 504b may also be attached to adjuster screw 502. As illustrated, second jam nut 504b may be disposed between top slot 514 and bottom slot 516 and abut against a bottom face of roller adjustment carrier 506. In some embodiments, a washer 518 may also be present and disposed on adjuster screw 502 and abut against bottom slot 516. A stud nut 520 or other similar locking fastener may be configured to secure adjuster screw 502 within fitting body 510 as shown. To adjust a vertical position of track door 102, adjuster screw 502 may be adjusted by loosening stud nut 522, followed by loosening jam nuts 504a, 504b. Once loosened, adjuster screw 502 may be adjusted to alter the vertical position of track door 102. Once the desired vertical position is reached, jam nuts 504a, 504b and stud nut 522 may be tightened to lock adjuster screw 502 in place, such that track door 102 meets the contour of tail cone 100. This process may then be repeated for second track roller fitting 308b, third track roller fitting 308c, and fourth track roller fitting 308d as necessary.

Track roller 508 may ride within the tracks on actuators 402a, 402b to move track door 102 forwards and aft. Track roller 508 may be connected to roller adjustment carrier 506 via an axle extending from track roller 508 through a slot in fitting body 510. Track roller 508 may then be secured via stud nut 522 as shown. In some embodiments, track roller 508 has a contact angle of about 15° to about 25° with respect to the track. In some embodiments, track roller 508 has a contact angle of about 25° when track door 102 is in the closed position. In some embodiments, the contact angle for track roller 508 is about 0° to about 5° when track door 102 is in the open position. Stud nut 522 may be disposed on a side opposite track roller 508 and may be used to lock roller adjustment carrier 506 against fitting body 510.

Also illustrated in FIG. 5 is tie rod fitting 524 for attaching a tie rod 612 (see FIG. 6) to track door 102, thus connecting track door 102 to actuators 402a, 402b. Tie rod fitting bolts 526 may be removed from track door 102, which enables track door 102 to be removed from tail cone 100, as will be discussed in further detail below. In some embodiments, roller fitting bolts 512 and tie rod fitting bolts 526 are substantially similar.

Figure 6:
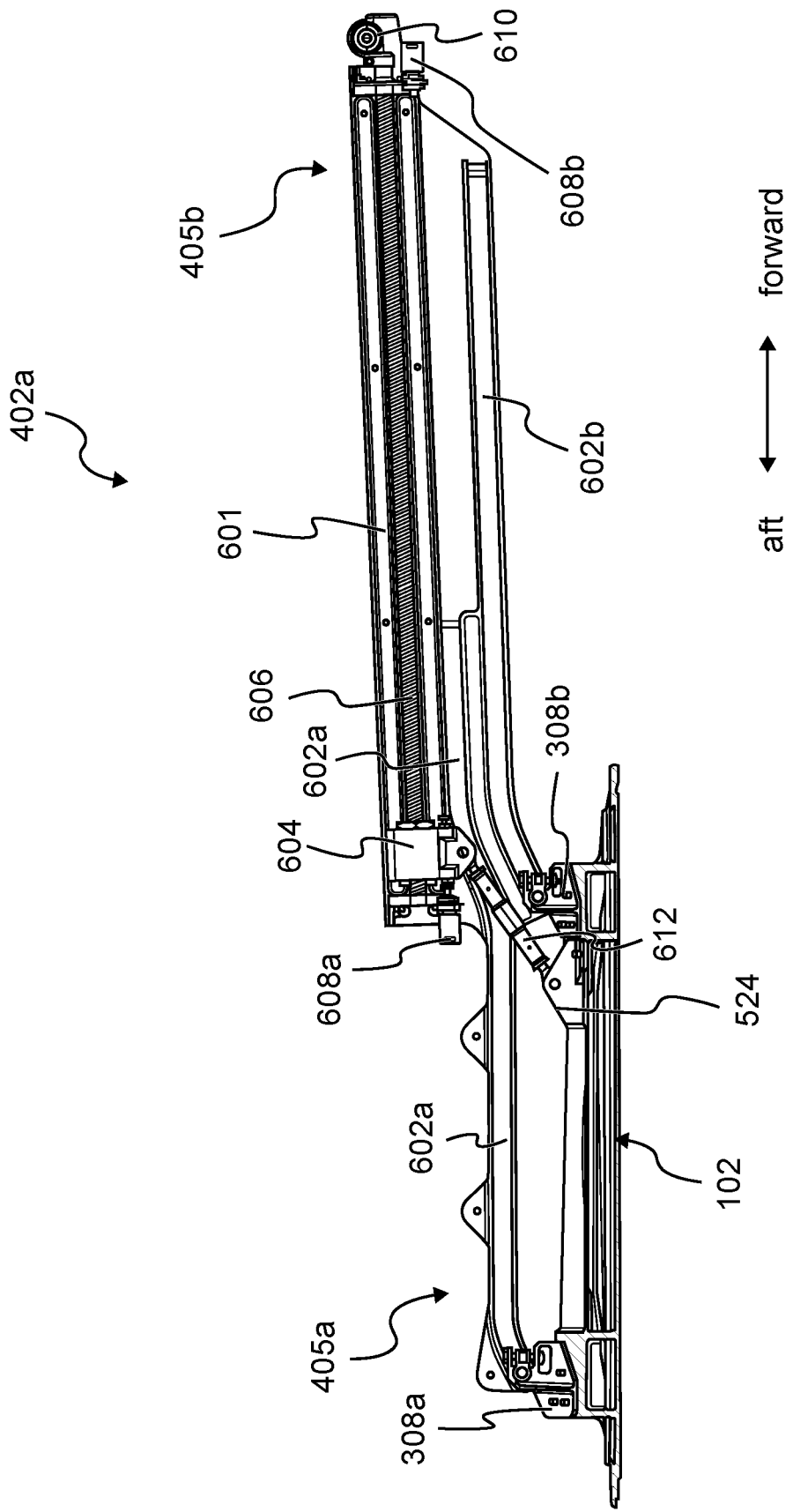
FIG. 6 is a side view of the track door actuator system of FIG. 4.

Turning now to FIG. 6, first actuator 402a is illustrated for some embodiments. First actuator 402a and second actuator 402b may be substantially similar (e.g., arranged as mirror images of one another). In some embodiments, first actuator 402a comprises frame 601 upon which the various components of first actuator 402a are mounted. In some embodiments, frame 601 is formed from a single piece of material. Frame 601 may comprise aluminum, stainless steel, titanium, or various other metals or metal alloys. As described above, first actuator 402a and second actuator 402b may be configured to retract track door 102 using a ball-screw mechanism and a linear motion guide. As shown, first track roller fitting 308a is configured to move forward and aft via a first track 602a, and second track roller fitting 308b is configured to move forward and aft via a second track 602b. First track 602a may ride above second track 602b, thus facilitating the inward retraction of track door 102 into tail cone 100. An aft end of first track 602a and second track 602b each include a curvature configured for lifting track door 102 upwards during an initial phase of opening, such that track door 102 is lifted inside the tail cone then rolled forwardly away from doorway 202. In some embodiments, tracks 602a, 602b comprise an anodized surface to reduce friction between tracks 602a, 602b and track rollers 508 disposed on track roller fittings 308a, 308b. In some embodiments, tracks 602a, 602b may be lined with a lubricating strip to increase the life of tracks 602a, 602b and track rollers 508.

As briefly described above, the movement of track door 102 may be facilitated using a linear motion guide assembly comprising a movement carriage 604 and a motion driver 606 that converts rotational motion to linear motion. As motion driver 606 is powered by drive unit 404 (FIG. 4), movement carriage 604 may translate down motion driver 606, thus moving track door 102. In some embodiments, motion driver 606 is a ball screw and ball nut motion driver. In some embodiments, motion driver 606 has a diameter of about 0.5 inch and a lead of about 0.5 inch. Motion driver 606 may comprise a steel alloy with a chromium plating. Various other linear motion systems may be used in embodiments described herein in place of the linear motion guide assembly illustrated in FIG. 6. For example, lead screws, a pulley system, a belt system, a rack and pinion system, a roller pinion system, and the like may be used for translating track door 102.

To determine when track door 102 is in the open and closed position, first actuator 402a may comprise a first end position sensor 608a towards a first end and a second end position sensor 608b towards the second end, opposite the first end. As depicted in FIG. 6, the first end is the aft end and the second end is the forward end. Triggering first end position sensor 608a may be indicative of track door 102 being in the closed position. Triggering second end position sensor 608b may be indicative of track door 102 in the open position. In some embodiments, end position sensors 608a, 608b are limit switches that are actuated upon contact with movement carriage 604. In some embodiments, triggering second end position sensor 608b causes a signal to be sent that triggers the deployment of sensor 204. A right angle gearbox 610 is disposed substantially near second end position sensor 608b. Right angle gearbox 610 may convert the motion provided by one of driveshafts 406a, 406b (see FIG. 4) to motion driver 606 thus moving track door 102. In some embodiments, right angle gearbox 610 comprises a 1:1 gear ratio.

First actuator 402a may also comprise tie rod 612 connecting track door 102 to movement carriage 604. As briefly described above, track door 102 may be removable from tail cone 100. By disconnecting tie rod 612 from tie rod fitting 524, track door 102 may be removed from tail cone 100 in the case of a power failure in drive unit 404 or to perform maintenance of track door 102. In some embodiments, tie rod 612 is easily accessible when track door 102 is in the open position, as depicted in FIG. 2A, and may be removed by removing bolts 512 (see FIG. 5) connecting tie rod 612 to track door 102 via tie rod fitting 524. Once disconnected from tie rod 612, track door 102 may be moved forward along tracks 602a, 602b and removed from tail cone 100 via access door opening 408. In some embodiments, tie rod 612 has an adjustable length, which enables adjustment to the position of track door 102 along the longitudinal (i.e., forward/aft) direction. For example, decreasing the length moves track door 102 forward, while increasing the length moves track door 102 aft.

Figure 7:
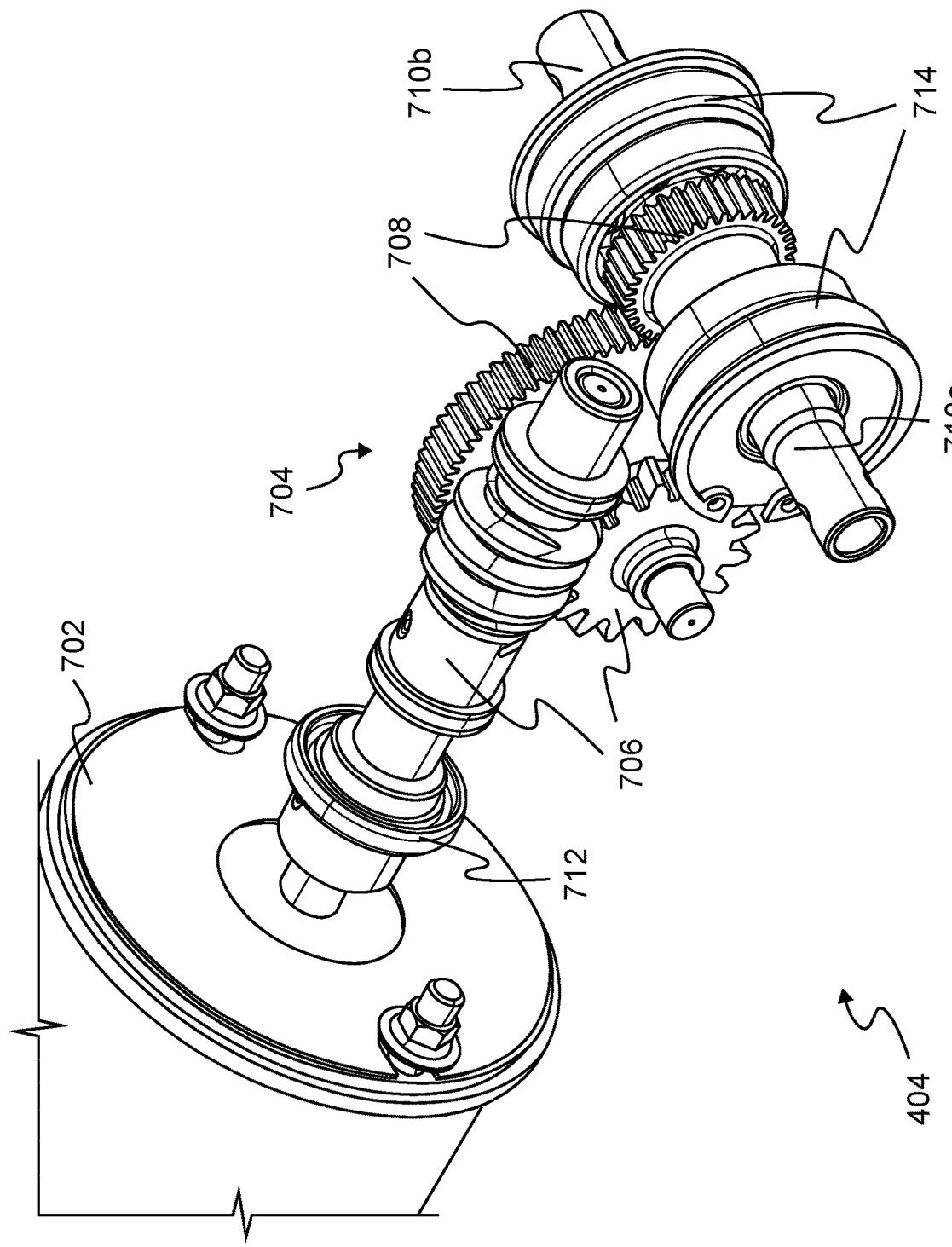
FIG. 7 illustrates a drive unit for powering the track door system for some embodiments.

FIG. 7 illustrates drive unit 404 comprising motor 702 connected to gearbox 704 for some embodiments. Drive unit 404 may be disposed towards the forward end of doorway 202 (see FIG. 2A). In some embodiments, drive unit 404 is controlled using an electrical control system. The electrical control system may utilize a two-position switch, with a first position signaling track door system 400 to open track door 102 and a second position signaling track door system 400 to close track door 102. In some embodiments, switching the control system to the second position causes the retraction of sensor 204. When it is detected that sensor 204 is fully retracted, a signal may be sent to translate track door 102 from the open position back to the closed position.

In some embodiments, motor 702 is one of a brushed motor or a brushless motor. In some embodiments, motor 702 is a 28V DC brushed motor. In some embodiments, motor 702 is configured such that the output of drive unit 404 is about 10 in-lb of torque to about 15 in-lb of torque to drive track door system 400 when drive unit 404 is operating at about 300 rpm. Motor 702 may comprise symmetric winding, thus allowing for bidirectional performance of the motor. Motor 702 may also be configured with high-altitude brushes to function at high altitudes.

Motor 702 may be connected to gearbox 704 to transfer power to track door system 400. For clarity of illustration, the housing for gearbox 704 is omitted from FIG. 7. As shown, motor 702 outputs power to worm gear set 706, which is in turn mated to spur gears 708. In some embodiments, worm gear set 706 has a gear ratio of 16/1. In some embodiments, worm gear set 706 is configured to prevent motor 702 from being backdriven, thus preventing the need for a separate brake for drive unit 404. The use of worm gear set 706 may prevent track door system 400 from moving when motor 702 is off. In some embodiments, worm gear set 706 comprises 8620 case hardened steel. Worm gear set 706 then mates to spur gears 708. In some embodiments, spur gears 708 have an output gear ratio of 1/2, thus providing a 2/1 speed increase. As such, gearbox 704 may comprise an overall gear ratio of 8/1. In some embodiments, spur gears 708 comprise 8620 case hardened steel. Spur gears 708 may then connect to first output shaft 710a and second output shaft 710b. Output shafts 710a, 710b may then connect to driveshafts 406a, 406b (see FIG. 4), thus powering actuators 402a, 402b.

In some embodiments, gearbox 704 is entirely sealed to prevent contaminants from entering. Gearbox 704 may comprise an input seal 712 located between motor 702 and gearbox 704 and output seals 714 between spur gears 708 and output shafts, 710a, 710b. In some embodiments, input seal 712 comprises a gasket. Input seal 712 may comprise rubber, or a polymer such as polyurethane, polytetrafluoroethylene, or polyester. In some embodiments, output seals 714 are substantially similar to input seal 712. In some embodiments, output seals 714 comprise a dual lip output shaft seal comprising a lubricant ring and a dust seal to prevent dust from entering gearbox 704. In some embodiments, gearbox 704 comprises bearing grease for lubricating the various gears. In some embodiments, the bearing grease is lithium-soap grease.

Figure 8:
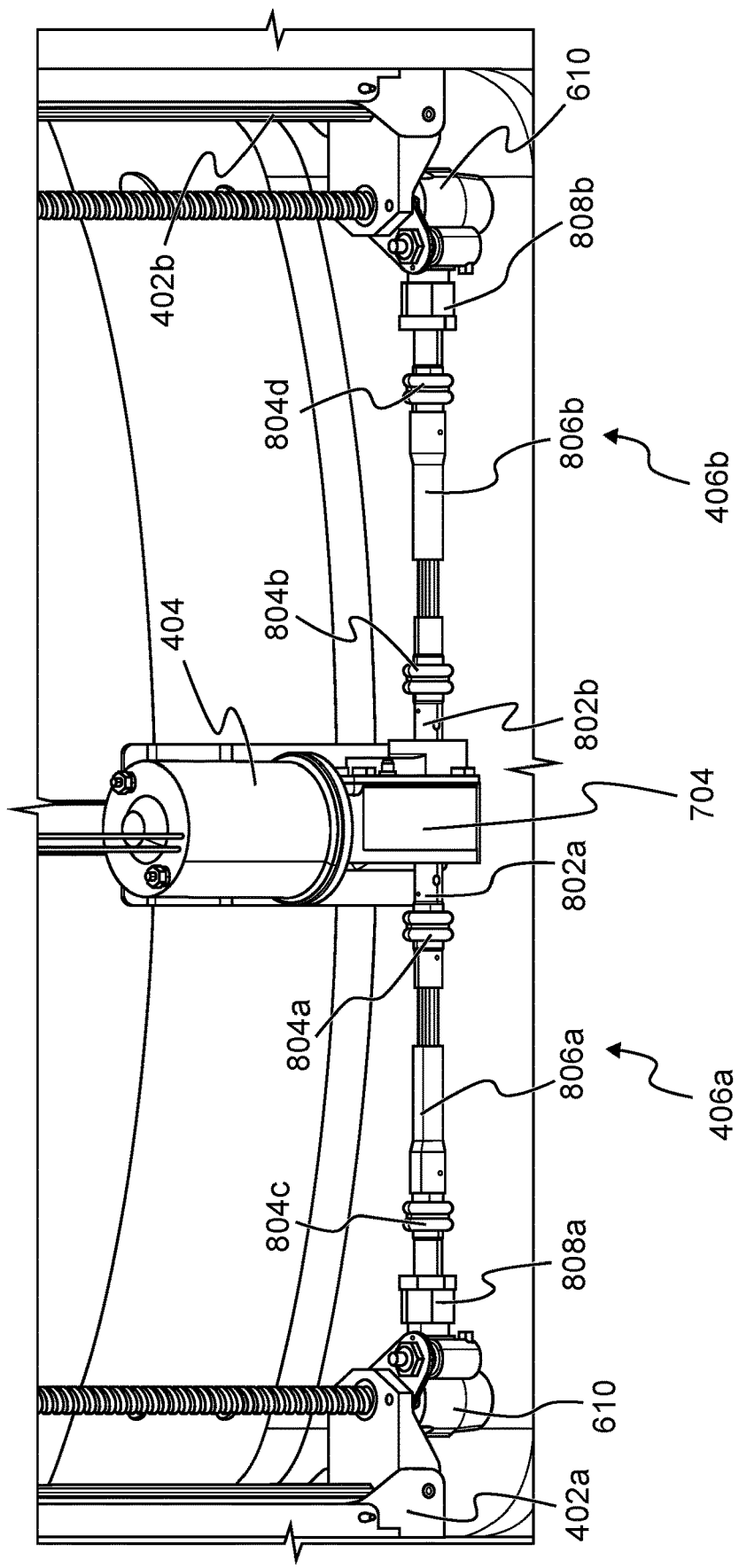
FIG. 8 illustrates a pair of drive shafts for some embodiments.

FIG. 8 illustrates driveshafts 406a, 406b for some embodiments. As shown, in some embodiments, first driveshaft 406a and second driveshaft 406b are substantially similar. Beginning from gearbox 704, first output shaft 710a (see FIG. 7) is connected to a first cross bolt 802a, and second output shaft 710b (see FIG. 7) is connected to a second cross bolt 802b. First cross bolt 802a is then connected, via first joint 804a, to a first slip spline 806a. First slip spline 806a is in turn connected, via third joint 804c to a first retaining nut 808a. In turn, first retaining nut 808a connects first driveshaft 406a to right angle gearbox 610, and, thus, to motion driver 606. A substantially similar arrangement may be present on second driveshaft 406b, wherein a second joint 804b connects second cross bolt 802b to a second slip spline 806b. Second slip spline 806b may in turn connect to a second retaining nut 808b via a fourth joint 804d. Slip splines 806a, 806b may be configured to transmit torque and rotation through the drive shaft. Second retaining nut 808b in turn connects to right angle gearbox 610 on second actuator 402b. Retaining nuts 808a, 808b may be configured to secure driveshafts 406a, 406b to right angle gearboxes 610 and prevent any loosening due to vibration and/or rotation of track door system 400 during operation and during flight. In some embodiments, bearing nuts 808a, 808b are paired with spring lock washers to further decrease the chance of components on driveshafts 406a, 406b from loosening.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A track door system for an aircraft, the track door system comprising:
    a door comprising a single piece of material, wherein the door comprises a first side and a second side opposite the first side;
    a first roller track and a second roller track, wherein the first roller track and the second roller track are aligned adjacent one another on the first side of the door;
    a third roller track and a fourth roller track, wherein the third roller track and the fourth roller track are aligned adjacent one another on the second side of the door;
    a first motion driver configured to move the door along the first roller track and the second roller track;
    a second motion driver configured to move the door along the third roller track and the fourth roller track;
    a maintenance opening located between the first and second motion drivers;
    an access panel located adjacent the door and configured to conceal the maintenance opening, wherein the access panel is removable to provide access to the maintenance opening for accessing the interior of the aircraft; and a drive unit operatively coupled to the first motion driver and the second motion driver, wherein the drive unit is configured to provide electromechanical power for driving the first motion driver and the second motion driver to cooperatively move the door forward to an open position or aft to a closed position.

2. The track door system of claim 1, comprising:
a first driveshaft operatively coupling the drive unit to the first motion driver; and
a second driveshaft operatively coupling the drive unit to the second motion driver, wherein the drive unit is centrally disposed between the first side and the second side.

3. The track door system of claim 2, wherein the first driveshaft is operatively coupled to the first motion driver via a first right angle gearbox and the second driveshaft is operatively coupled to the second motion driver via a second right angle gearbox.

4. The track door system of claim 1, wherein the drive unit comprises an electric motor and a gear box having a worm gear set configured to prevent the door from moving when the electric motor is off.

5. The track door system of claim 1, wherein the drive unit is disposed at a forward end of the first, second, third, and fourth roller tracks.

6. The track door system of claim 1, wherein when the door is moved aft to the closed position, an unobstructed opening is formed between the first and second roller tracks on the first side and the third and fourth roller tracks on the second side.

7. The track door system of claim 1, wherein the door is disposed in a bottom side of a tail cone fairing of the aircraft.

8. The track door system of claim 7, wherein the door comprises:
a first roller fitting having a roller configured for rolling within the first roller track;
a second roller fitting having a roller configured for rolling within the second roller track;
a third roller fitting having a roller configured for rolling within the third roller track; and
a fourth roller fitting having a roller configured for rolling within the fourth roller track.

9. The track door system of claim 8, wherein the first, second, third, and fourth roller fittings each comprise:
a roller adjustment carrier coupled to the roller via an axle; and
an adjuster screw having a first jam nut and a second jam nut configured for adjusting a height of the roller adjustment carrier,
wherein adjustment of the first, second, third, and fourth roller fittings enables the door to conform to an outer mold line of the tail cone making the door substantially flush with an external surface of the tail cone.

10. The track door system of claim 1, comprising:
a first movement carriage configured to provide linear translation of the door via rotation of the first motion driver; and
a second movement carriage configured to provide linear translation of the door via rotation of the second motion driver.

11. The track door system of claim 10, wherein the first movement carriage is pivotably coupled to the first roller fitting via a first tie rod and the second movement carriage is pivotably coupled to the second roller fitting via a second tie rod.

12. The track door system of claim 11, wherein the first tie rod and the second tie rod each comprise an adjustable length that enables forward and aft adjustment to a position of the door.

13. The track door system of claim 11, wherein the first tie rod comprises a first removable bolt configured for pivotably coupling with the first roller fitting and the second tie rod comprises a second removable bolt configured to pivotably couple with the second roller fitting, and wherein removal of the first and second removable bolts enables the door to be moved forward along the first, second, third, and fourth roller tracks and removed from the aircraft.

14. A track door system for use in a tail cone of an aircraft, the track door system comprising:
a doorway in a bottom side of the tail cone;
a track door configured for opening and closing the doorway, the track door comprising:
a forward pair of tracks mounted inside the tail cone on opposite sides of the track door;
a forward pair of rollers each mounted on a forward end of the track door and configured to roll in a respective one of the forward pair of tracks;
an aft pair of tracks mounted inside the tail cone on opposite sides of the track door; and
an aft pair of rollers each mounted on an aft end of the track door and configured to roll in a respective one of the aft pair of tracks;
a pair of motion drivers disposed on opposite sides of the track door;
an electric motor, a first driveshaft, and a second driveshaft, wherein the first driveshaft and the second driveshaft operatively couple the electric motor to the pair of motion drivers, respectively, for moving the track door between an open position and a closed position;
an access panel disposed forward of the doorway in the bottom side of the tail cone, wherein the access panel is disposed between the forward pair of tracks;
the track door is configured to roll forwards and upwards along the forward pair of tracks and the aft pair of tracks for stowing inside the tail cone while the track door is in the open position;
the track door is configured to roll aft and downwards for sealing the doorway while the track door is in the closed position; and
removal of the access panel provides an opening for accessing an inside of the tail cone between the forward pair of tracks while the track door is in the closed position, wherein the electric motor, first driveshaft, and second driveshaft are disposed at a forward end of the forward pair of tracks and configured to avoid obstructing access through the opening.

15. The track door system of claim 14, comprising an instrument configured for deployment downwards through the doorway while the track door is in the open position.

16. The track door system of claim 15, wherein the track door is configured to be removable such that removal of the track door enables access to the tail cone via the access panel while the instrument is deployed through the doorway.

17. The track door system of claim 16, comprising:
a pair of fittings mounted on an interior side of the track door adjacent a forward end of the track door;
a pair of tie rods each pivotally coupled to a respective one of the pair of fittings; and
a pair of movement carriages each pivotally coupled to a respective one of the pair of tie rods, wherein each of the pair of movement carriages provides linear translation of the track door via a respective one of the pair of motion drivers.

18. The track door system of claim 14, wherein an aft end of each of the forward pair of tracks and an aft end of each of the aft pair of tracks comprises a curvature configured for lifting the track door upwards during an initial phase of opening of the track door such that that track door is lifted inside the tail cone then rolled away from the doorway.

19. The track door system of claim 14, comprising:
   a seal disposed on an outer side of the track door; and
   an inside edge of the doorway, wherein the seal and the inside edge are configured to interface with one another to form a water-tight seal between the track door and the doorway.

20. A track door system for an aircraft, the track door system comprising:
   a door comprising a single piece of material, wherein the door comprises a first side and a second side opposite the first side;
   a first roller track and a second roller track, wherein the first roller track and the second roller track are aligned adjacent one another on the first side of the door;
   a third roller track and a fourth roller track, wherein the third roller track and the fourth roller track are aligned adjacent one another on the second side of the door;
   a first motion driver configured to move the door along the first roller track and the second roller track;
   a second motion driver configured to move the door along the third roller track and the fourth roller track;
   a drive unit operatively coupled to the first motion driver and the second motion driver,
   wherein the drive unit is configured to provide electromechanical power for driving the first motion driver and the second motion driver to cooperatively move the door forward to an open position or aft to a closed position;
   wherein the door is disposed in a bottom side of a tail cone fairing of the aircraft; and
   wherein the door comprises:
      a first roller fitting having a roller configured for rolling within the first roller track;
      a second roller fitting having a roller configured for rolling within the second roller track;
      a third roller fitting having a roller configured for rolling within the third roller track; and
      a fourth roller fitting having a roller configured for rolling within the fourth roller track;
   wherein the first, second, third, and fourth roller fittings each comprise:
      a roller adjustment carrier coupled to the roller via an axle; and
      an adjuster screw having a first jam nut and a second jam nut configured for adjusting a height of the roller adjustment carrier,
   wherein adjustment of the first, second, third, and fourth roller fittings enables the door to conform to an outer mold line of the tail cone making the door substantially flush with an external surface of the tail cone.

* * * * *